(12) United States Patent
Law-How-Hung et al.

(10) Patent No.: US 10,929,599 B1
(45) Date of Patent: *Feb. 23, 2021

(54) METHODS AND SYSTEMS FOR WEBSITE CONTENT MANAGEMENT

(71) Applicant: CITICORP CREDIT SERVICES, INC. (USA), Sioux Falls, SD (US)

(72) Inventors: France Law-How-Hung, Mason, OH (US); Sam Shahdousti, Los Angeles, CA (US); Patrick Law, Mason, OH (US); Anna Putnam, San Francisco, CA (US); Peter Lomenzo, Redondo Beach, CA (US)

(73) Assignee: CITICORP CREDIT SERVICES, INC. (USA), Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,799

(22) Filed: Mar. 28, 2019

Related U.S. Application Data

(63) Continuation of application No. 15/472,396, filed on Mar. 29, 2017, now Pat. No. 10,289,675, which is a
(Continued)

(51) Int. Cl.
*G06F 17/00* (2019.01)
*G06F 40/186* (2020.01)
(Continued)

(52) U.S. Cl.
CPC .......... *G06F 40/186* (2020.01); *G06F 3/0482* (2013.01); *G06F 16/986* (2019.01); *G06F 40/117* (2020.01)

(58) Field of Classification Search
CPC ... G06F 17/2247; G06F 40/186; G06F 16/986
(Continued)

(56) References Cited

U.S. PATENT DOCUMENTS

| 5,878,403 A | 3/1999 | Defrancesco et al. |
| 6,003,019 A | 12/1999 | Eaton et al. |

(Continued)

OTHER PUBLICATIONS

Office Action for U.S. Appl. No. 11/751,207, dated Feb. 12, 2014, 11.
(Continued)

*Primary Examiner* — Manglesh M Patel
(74) *Attorney, Agent, or Firm* — Johnson, Marcou, Isaacs & Nix, LLC; George Marcou; Scott A. Hendrix

(57) ABSTRACT

Computer computer-implemented methods and systems for creating and managing website content involve, for example, providing a user at a computer terminal a data capture template for a user-selected content type, providing the user at the computer terminal presentation pages using content management tags, allowing the user at the computer terminal to author content using the data capture template, and allowing the user at the computer terminal to deploy the content to a server. Other aspects of the methods and systems for creating and managing website content include, for example, allowing the user to personalize content, allowing the user to embed dynamic content in the middle of static content, allowing the user to refresh the deployed content in real-time without impacting current existing user sessions on the server where content is being deployed.

22 Claims, 16 Drawing Sheets

Related U.S. Application Data continuation of application No. 11/751,207, filed on May 21, 2007, now Pat. No. 9,639,621, which is a continuation-in-part of application No. 11/242,565, filed on Oct. 3, 2005, now Pat. No. 10,636,084.

(60) Provisional application No. 60/615,568, filed on Oct. 1, 2004.

(51) Int. Cl.
 *G06F 3/0482* (2013.01)
 *G06F 16/958* (2019.01)
 *G06F 40/117* (2020.01)

(58) Field of Classification Search
 USPC .................................. 715/234, 243, 200, 235
 See application file for complete search history.

(56) References Cited

U.S. PATENT DOCUMENTS

| | | | |
|---|---|---|---|
| 6,064,990 | A | 5/2000 | Goldsmith |
| 6,347,307 | B1 | 2/2002 | Sandhu et al. |
| 6,427,132 | B1 | 7/2002 | Bowman-Amuah et al. |
| 6,473,794 | B1 | 10/2002 | Guheen et al. |
| 6,748,420 | B1 | 6/2004 | Quatrano et al. |
| 7,316,003 | B1 | 1/2008 | Dulepet et al. |
| 7,565,643 | B1 | 7/2009 | Sweet et al. |
| 2002/0136214 | A1 | 9/2002 | Do et al. |
| 2003/0046689 | A1 | 3/2003 | Gaos et al. |
| 2003/0061132 | A1 | 3/2003 | Yu et al. |
| 2004/0123238 | A1 | 6/2004 | Hefetz et al. |
| 2004/0230947 | A1 | 11/2004 | Bales et al. |
| 2010/0268661 | A1 | 10/2010 | Levy et al. |
| 2013/0090998 | A1 | 4/2013 | Shimogori et al. |

OTHER PUBLICATIONS

Final Office Action for U.S. Appl. No. 11/242,565, dated Feb. 2, 2009, 21.

European Office Action for European Patent Application No. 05802843.2, dated Feb. 6, 2013, 9.

Office Action for U.S. Appl. No. 11/242,565, dated Mar. 26, 2014, 26.

Office Action for U.S. Appl. No. 11/751,207, dated Mar. 5, 2010, 9.

Office Action for U.S. Appl. No. 11/751,207, dated Mar. 8, 2016, 14.

Office Action for U.S. Appl. No. 11/242,565, dated Apr. 23, 2015, 29.

csbsju.edu (College of Saint Benedict & Saint John's University), Class Java.util.date, May 10, 2001, 1-11.

Office Action for U.S. Appl. No. 15/472,396, dated May 31, 2018, 14.

Extended European Search Report and Written Opinion for European Patent Application No. 05802843.2, dated Jun. 12, 2012, 5.

Office Action for U.S. Appl. No. 11/242,565, dated Jun. 15, 2012, 22.

Final Office Action for U.S. Appl. No. 11/751,207, dated Jun. 4, 2014, 11.

Final Office Action for U.S. Appl. No. 11/751,207, dated Jul. 9, 2010, 11.

Final Office Action for U.S. Appl. No. 11/751,207, dated Aug. 19, 2016, 14.

Office Action for U.S. Appl. No. 11/751,207, dated Aug. 27, 2015, 12.

Final Office Action for U.S. Appl. No. 11/242,565, dated Sep. 1, 2009, 23.

Office Action for U.S. Appl. No. 11/242,565, dated Sep. 11, 2014, 25.

Office Action for U.S. Appl. No. 11/242,565, dated Sep. 19, 2008, 21.

Final Office Action for U.S. Appl. No. 11/242,565, dated Sep. 27, 2012, 26.

"The Java 2 Enterprise Edition Developer's Guide, Version 1.2.1", Sun Microsystems, Internet Citation, retrieved from the Internet URL: http://java.sun.com/j2see/sdk_1.2.1/devguide1_2_1.pdf [retrieved on Nov. 3, 2006], May 1, 2000, 201.

Bergsten, "JSTL 1.0: Standardizing JSP, Part 1", Aug. 14, 2002, 1-10.

Hesmer, "Portlet Development Guide, Working with the Portlet API 1.1", Internet Citation, Apr. 2, 2002, XP002267927, retrieved from the Internet: URL: http://w.bis.business.utah.edu/resources/wps_project.htm [retrieved on Jan. 23, 2004, Apr. 2, 2002, 83.

METHODS AND SYSTEMS FOR WEBSITE CONTENT MANAGEMENT

PRIORITY APPLICATION

This application claims priority to and is a continuation of co-pending U.S. patent application Ser. No. 15/472,396 filed Mar. 29, 2017, entitled "Methods and Systems for Website Content Management", which was a continuation of U.S. patent application Ser. No. 11/751,207 filed May 21, 2007, entitled "Methods and Systems for Website Content Management" (now U.S. Pat. No. 9,639,621), which was a continuation-in-part of U.S. patent application Ser. No. 11/242,565 filed Oct. 3, 2005, entitled "Methods and Systems for Implementing On-Line Financial Institution Services Via a Single Platform", which claimed priority to U.S. Provisional Application No. 60/615,568 filed Oct. 1, 2004, entitled "Methods and Systems for Implementing On-Line Financial Institution Services Via a Single Platform", the entire contents of each of which are hereby expressly incorporated herein by this reference including, without limitation, the specification, claims, and abstract, as well as any figures, tables, or drawings thereof.

FIELD OF THE INVENTION

The present invention relates generally to the field of website content management, and more particularly to a content management framework that allows users to create or contribute website content without the need for any special knowledge or training, for example, regarding internal content structure.

BACKGROUND OF THE INVENTION

An entity, such as a global financial institution, has a current need for a content management (CM) framework that empowers its business users not only to manage website content but also to manage the entire website with little or no assistance in the way of development efforts from a development organization. It is well known that business users are generally less trained in development techniques and consequently require a relatively simple type of construct to be able to create and deploy content in a flexible fashion.

Entities, such as global financial institutions currently have a further need to support dynamic content (e.g., content in which information showing the content is acquired only while the server is actually running and not statically at the time the content is created). Two such examples of a dynamic feature of a website are: (1) showing the current time on a web page, (2) showing a particular Customer Service phone number specific to a category of users. Additionally, such entities have current needs, for example, to be able to create more customizable content management workflow and for hosting support and product support.

A commercially available content management platform presently utilized by many businesses using content management systems is a product known as TEAMSITE from INTERWOVEN. There is a current need for a content management product that empowers business users to manage website content as well as entire websites with little or no programmers assistance, that supports dynamic content, supports content personalized to the specific end-user, allows dynamic content to be embedded in the middle of static content, allows for real-time content update to the Production server without a server re-start and without impacting current existing user sessions, and which supports various commercially available systems, such as TEAMSITE and other commercially available content management systems.

SUMMARY OF THE INVENTION

It is a feature and advantage of the present invention to provide a content management framework that allows business users to create or contribute content without needing any knowledge of internal content structure.

It is a further feature and advantage of the present invention to provide a content management framework that enables content to be grouped together within a content type, such as promotion or products and services, and allows the content to be authored and managed by content type.

It is another feature and advantage of the present invention to provide a content management framework that affords the content author appropriate contextual frame when making changes.

It is still another feature and advantage of the present invention to provide a content management framework that makes construction of authoring templates, known as data capture templates (DCT's), easy by leveraging other available resources.

It is an additional feature and advantage of the present invention to provide a content management framework that provides an infrastructure that enables intelligent reuse of content.

It is another feature and advantage of the present invention to provide a content management framework with an infrastructure that enables content to be specified by reference, hence allowing a piece of content to be changed in only one place even though it is used on many pages.

It is a further feature and advantage of the present invention to provide a content management framework with an infrastructure that enables personalization attributes to be specified by the content author.

It is a still further feature and advantage of the present invention to provide a content management framework with an infrastructure that enables easy rule generation through a graphical user interface (GUI).

It is still another feature and advantage of the present invention to provide a content management framework that allows businesses to leverage their existing business investment in existing resources, such as content distribution facilities for deploying database content and flat files.

It is an additional feature and advantage of the present invention to provide a content management framework that enables the embedding of custom JAVA tags in content which in turn enables a content author to make content dynamic.

It is another feature and advantage of the present invention to provide a content management framework with an integrated personalization rule GUI that allows easy rule generation.

It is still another feature and advantage of the present invention to provide a content management framework that supports user-defined content types and personalization attributes.

It is a further feature and advantage of the present invention to provide a content management framework that supports content expiry and allows a business user to specify start and end dates for advertisements, promotions, or any other content.

It is a further feature and advantage of the present invention to provide a content management framework with an integrated category hierarchy builder and viewer that allows business to group content in a hierarchical fashion, for example, an FAQ list.

It is a still further feature and advantage of the present invention to provide a content management framework with automatic cache update upon content deployment.

It is still another feature and advantage of the present invention to provide a content management framework that with authoring and deploy edition workflows that are ready to be used as is or which can be customized.

It is a further feature and advantage of the present invention to provide a content management framework that empowers business users to own management of their own content with less process overhead.

It is another feature and advantage of the present invention to provide a content management framework that allows rapid deployment of 'business-as-usual' (BAU) content changes, for example, because content can be deployed at much more frequent intervals than software releases.

It is a still further feature and advantage of the present invention to provide a content management framework with customizable workflows, for example, such that the unique polices and procedures of any business can be incorporated into a workflow.

To achieve the stated and other features, advantages and objects, embodiments of the present invention employ computer hardware and software, including, without limitation, instructions embodied in program code encoded on machine readable medium, to provide computer computer-implemented methods and systems for creating and managing website content that involves, for example, providing a user at a computer terminal a data capture template for a user-selected content type, providing the user at the computer terminal presentation pages using content management tags, allowing the user at the computer terminal to author content using the data capture template, and allowing the user at the computer terminal to deploy the content to a server.

In embodiments of the invention, the user is provided the data capture template via a graphical user interface displaying fields for entry of content data for the user-selected content type and fields for adding supporting config files. Providing the user the data capture template for embodiments of the invention involves, for example, providing the user an Extensible Markup Language (XML) template that directs how the content data should be deployed to a web server through XML constructs in the template. Further, providing the user presentation pages for embodiments of the invention also involves, for example, providing the user presentation Java server pages via a graphical user interface for setting up page variables using cmset tags and for building a layout using cmout tags.

In addition, the user is allowed to create and edit the content via a graphical user interface displaying content fields for entering and editing content and to save the content via the graphical user interface to create a document content record. Allowing the user at the computer terminal to author and manage the content for embodiments of the invention involves, for example, embedding a custom tag, such as a date tag, inside the content. Additionally, allowing the user to deploy the content to the server involves, for example, allowing the user to deploy the content to a development server and to display the content dynamically in an application server, for example, on a website identically in appearance to the content authored by the user but with dynamic behavior.

Embodiments of the invention allow the user to deploy the content, for example, to either a web server or an application server. In addition, embodiments of the invention allow the user to deploy the content, for example, to a database server and to display and cache the content directly from the database. Allowing the user to deploy the content to a server also involves, for example, providing a preview of the page via a graphical user interface. Further, allowing the user to deploy the content to a server also involves, for example, converting the content from a predetermined format to an XML format, pushing the content into the server, and saving the content into relational database tables.

In a personalization aspect of embodiments of the invention, allowing the user at the computer terminal to author content using the data capture template involves, for example, allowing the user to author personalized content for alternative pages having the same layout and different content and to embed dynamic code within the personalized content. In addition, in the personalization aspect of embodiments of the invention, the user is allowed to create a personalization rule for displaying the alternative pages according to a profile of a bank customer using the website and to build a personalized Java server page via a graphical user interface by setting up page variables using the rule with a cmset tag such that the rule returns an alternative page depending on the profile of the bank website customer, and to build a layout using cmout tags.

A further aspect of embodiments of the invention allows the user at the computer terminal, for example, to add a content category to an existing category tree or build a new content category.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 6 shows examples of a graphical user interface (GUI) for use by the business user to create or edit contents in the DCT that involves, for example, filling in content fields and clicking on "Save" to automatically create a document content record (DCR);

FIG. 12 shows examples of a GUI for embodiments of the invention for building a personalized JSP that involves setting up page variables using a rule with the cmset tag such that the rule returns one of two versions of a customer page and building the layout using cmout tags;

FIG. 16 shows examples of a GUI for embodiments of the invention for building a presentation JSP to display all items from the category which involves looping through each promo in the promotions category and displaying utilizing the cmcategory tags.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Embodiments of the invention provide a content management framework that allows a business user to create content type (i.e., content templates) using standard instructions specified, for example, by the supplier of a particular content management system, such as TEAMSITE from INTERWO-VEN, and takes the content and displays it in a proprietary JAVA financial platform ("JFP") application server in a dynamic fashion. Thus, from the point of view of business users, little technical knowledge is required, and what is displayed on the website looks virtually identical to the content that was created by the business user but with a great deal of dynamic behavior. Embodiments of the invention accomplish this, for example, through providing support in both the content management system and the JFP application server.

Figure 1:
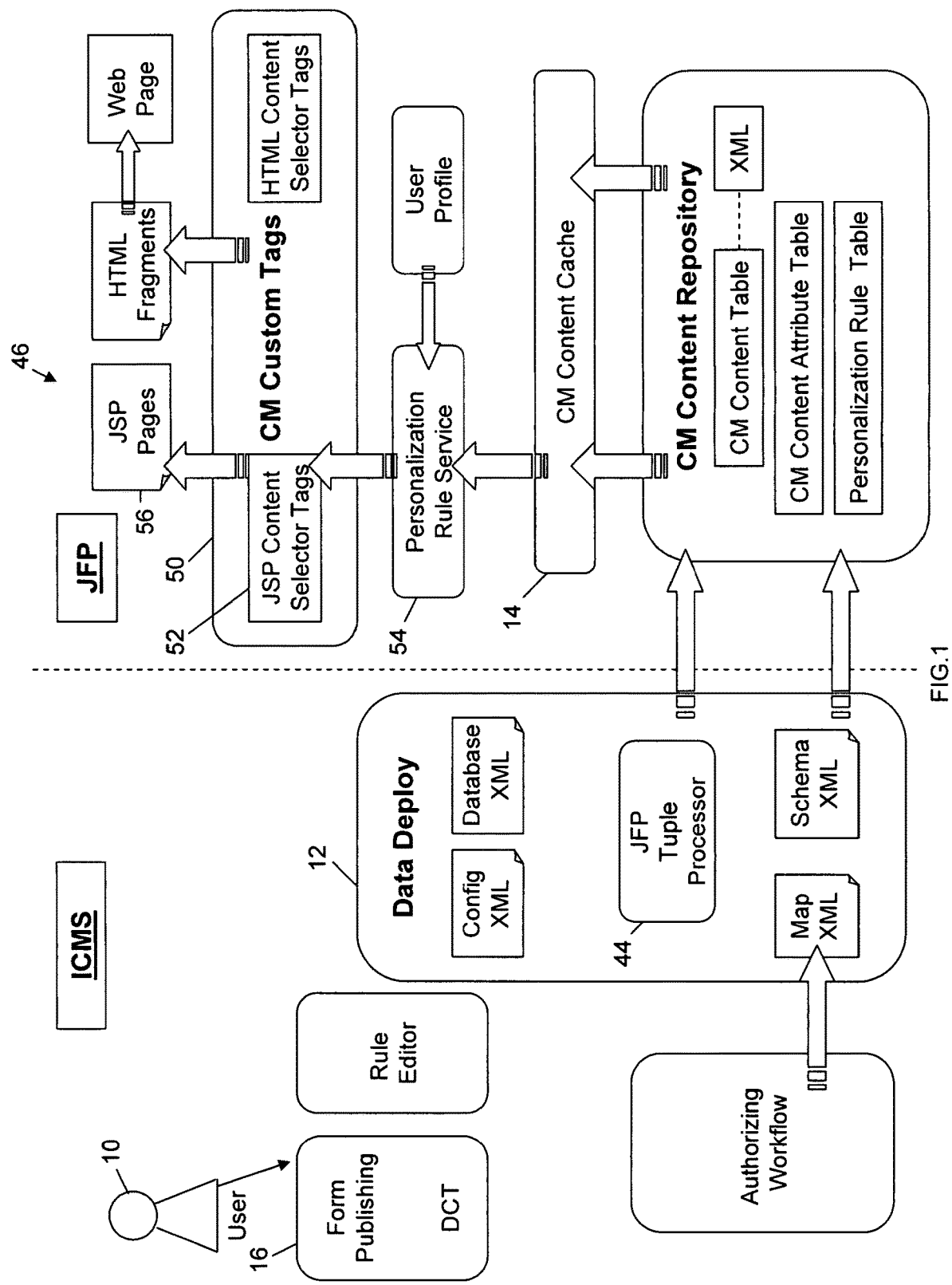
FIG. 1 is a schematic diagram that illustrates an overview example of key components and the flow of information between key components of the content management framework for embodiments of the invention.

FIG. 1 is a schematic diagram that illustrates an overview example of key components and the flow of information between key components of the content management framework for embodiments of the invention. By way of a brief explanation of how a content management system works in embodiments of the invention, a user 10 who is managing content for a website creates content within the content management system which could be a separate server. The user 10 then goes through a process called deployment 12 in which the data created by the user is deployed to either a web server or application server or Database server. In the case of JFP for embodiments of the invention, the data is most always deployed to a database server. Thus, the content is basically kept within the database in JFP and is then displayed and cached 14 from the database directly.

An example of a use case that demonstrates how embodiments of the invention accomplish the foregoing process to provide the functionality and the features that are required for a typical business user is referred to as 'promotions'. Promotions are what a website visitor sees as part of his or her computer screen display while visiting the website. In a promotions use case for embodiments of the invention, a business user 10 creates a data capture template ("DCT") 16. However, inside the content management system as part of the content management framework, embodiments of the invention employ an Extensible Markup Language ("XML") template that directs how the information should be deployed to a JFP web server through certain XML constructs in the template.

Figure 2:
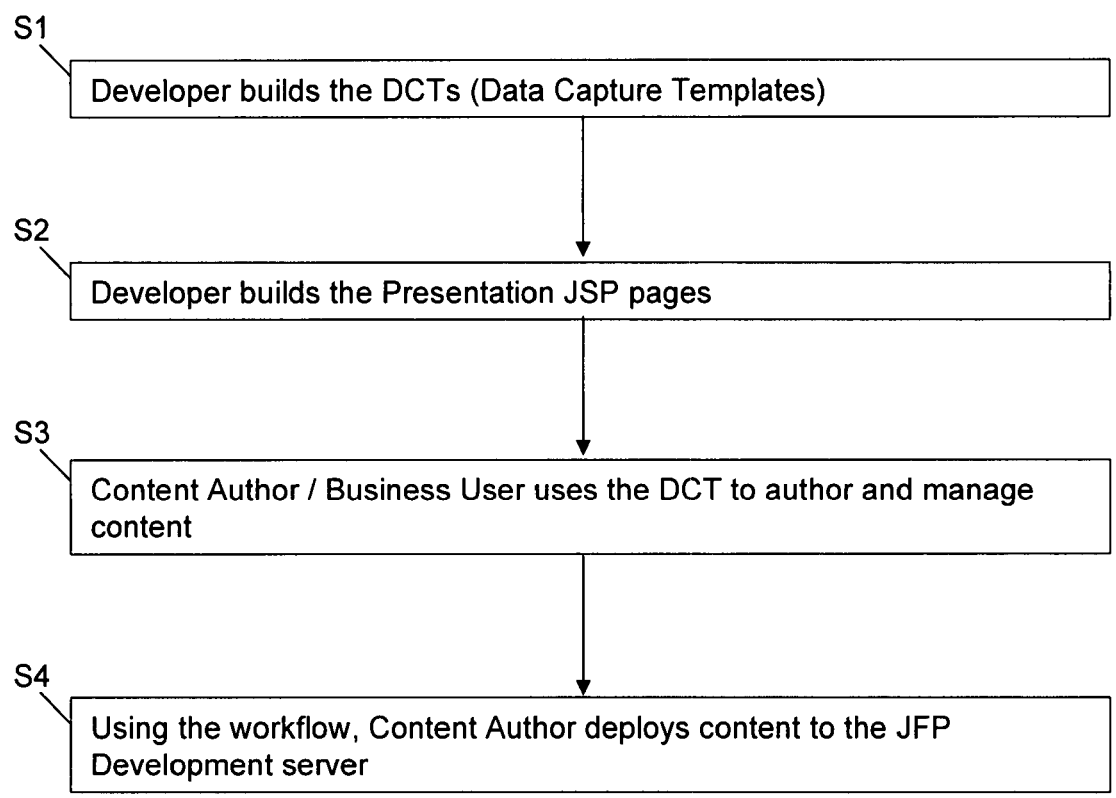
FIG. 2 is a flow chart which illustrates an example of the process of building appropriate pieces for displaying a set of promotion pages for a web site and allowing content management of such pages with the content management framework for embodiments of the invention.

FIG. 2 is a flow chart which illustrates an example of the process of building appropriate pieces for displaying a set of promotion pages for a web site and allowing content management of such pages with the content management framework for embodiments of the invention. Referring to FIG. 2, at S1, a developer builds data capture templates (DCT's) 16 which is a one-time only activity. At S2, the developer builds presentation JAVA SERVER PAGES (JSP's) which is likewise a one-time only activity. At S3, the content author or business user 10 uses the DCT 16 to author and manage content. At S4, using the workflow, the content author deploys content to a proprietary JFP development server.

Figure 3:
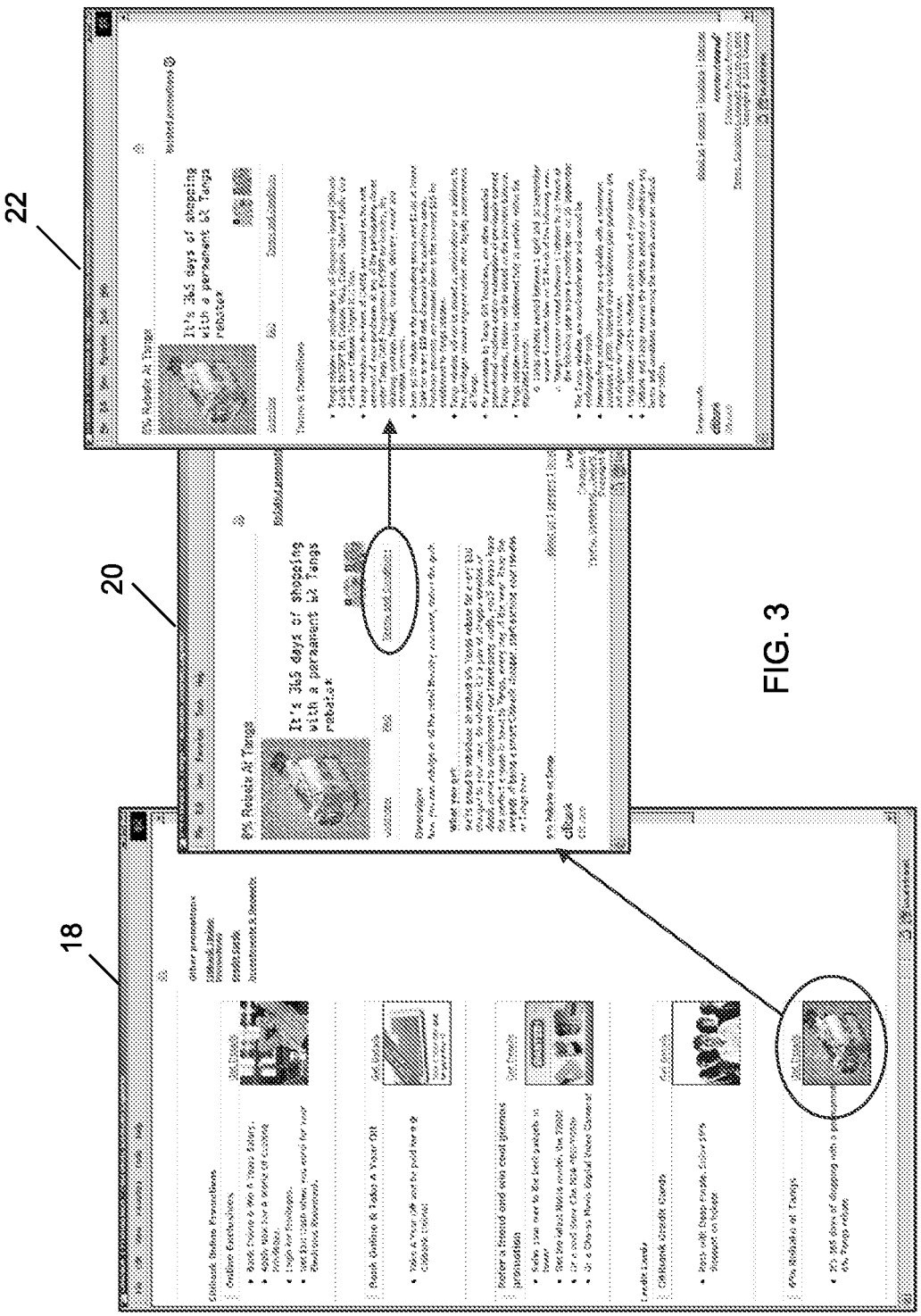
FIG. 3 shows examples of displays of content types for the content management framework for embodiments of the invention.

FIG. 3 shows examples of displays of content types for the content management framework for embodiments of the invention. Referring to FIG. 3, content types that are determined for the promotion pages include, for example, promo 18 which is a promotion landing page, with a title, selling points, and the like; promo details 20 which is a main page for a specific promo, with a main banner, overview, and the like; and promo sub details 22 which is a secondary info page for a specific promo, such as terms and conditions, and the like.

Figure 4:
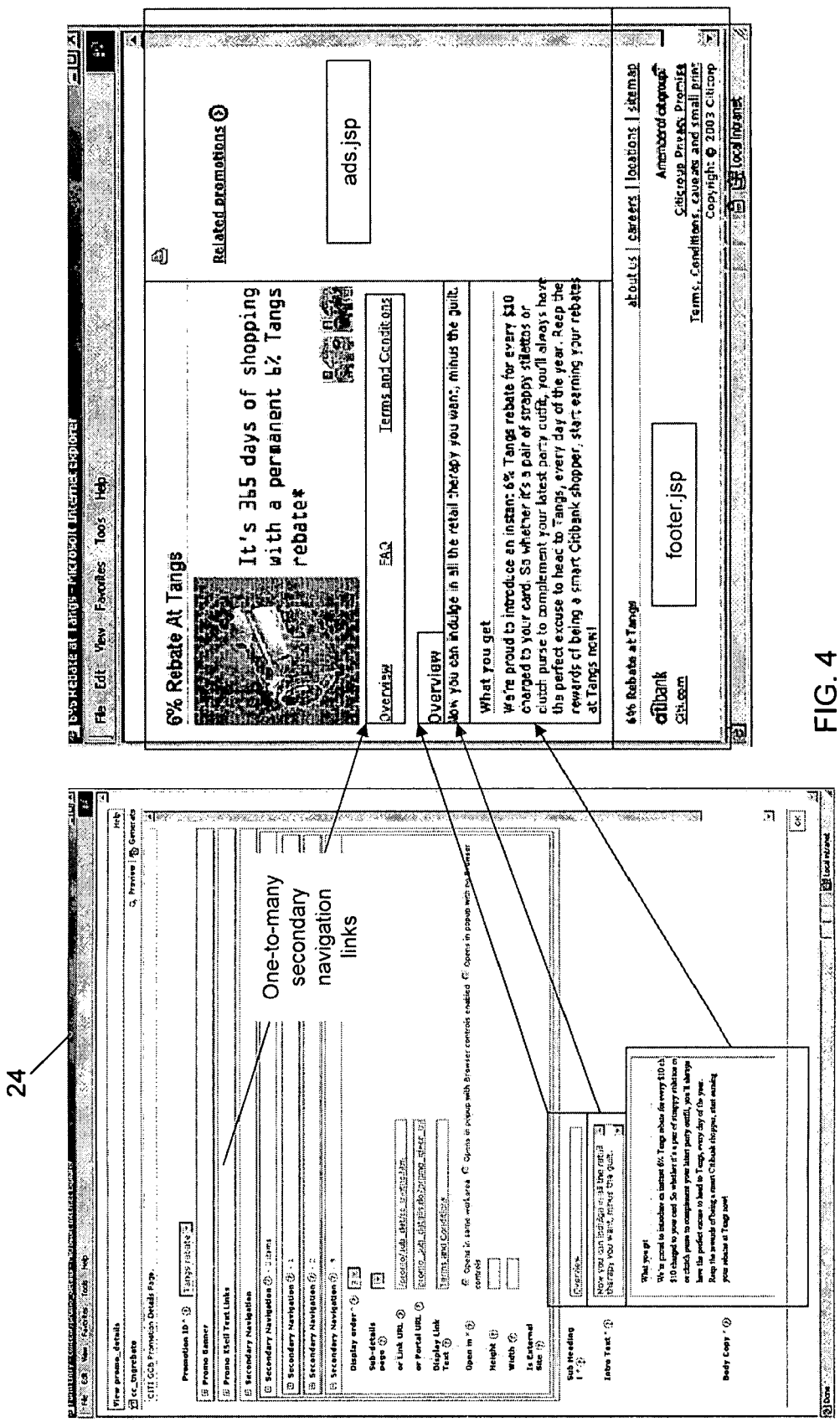
FIG. 4 shows examples of a graphical user interface (GUI) for embodiments of the invention for the business user's development of a data capture template (DCT) for promo details content type with necessary fields for data that the business user wants to content manage and add supporting config files.
Figure 5:
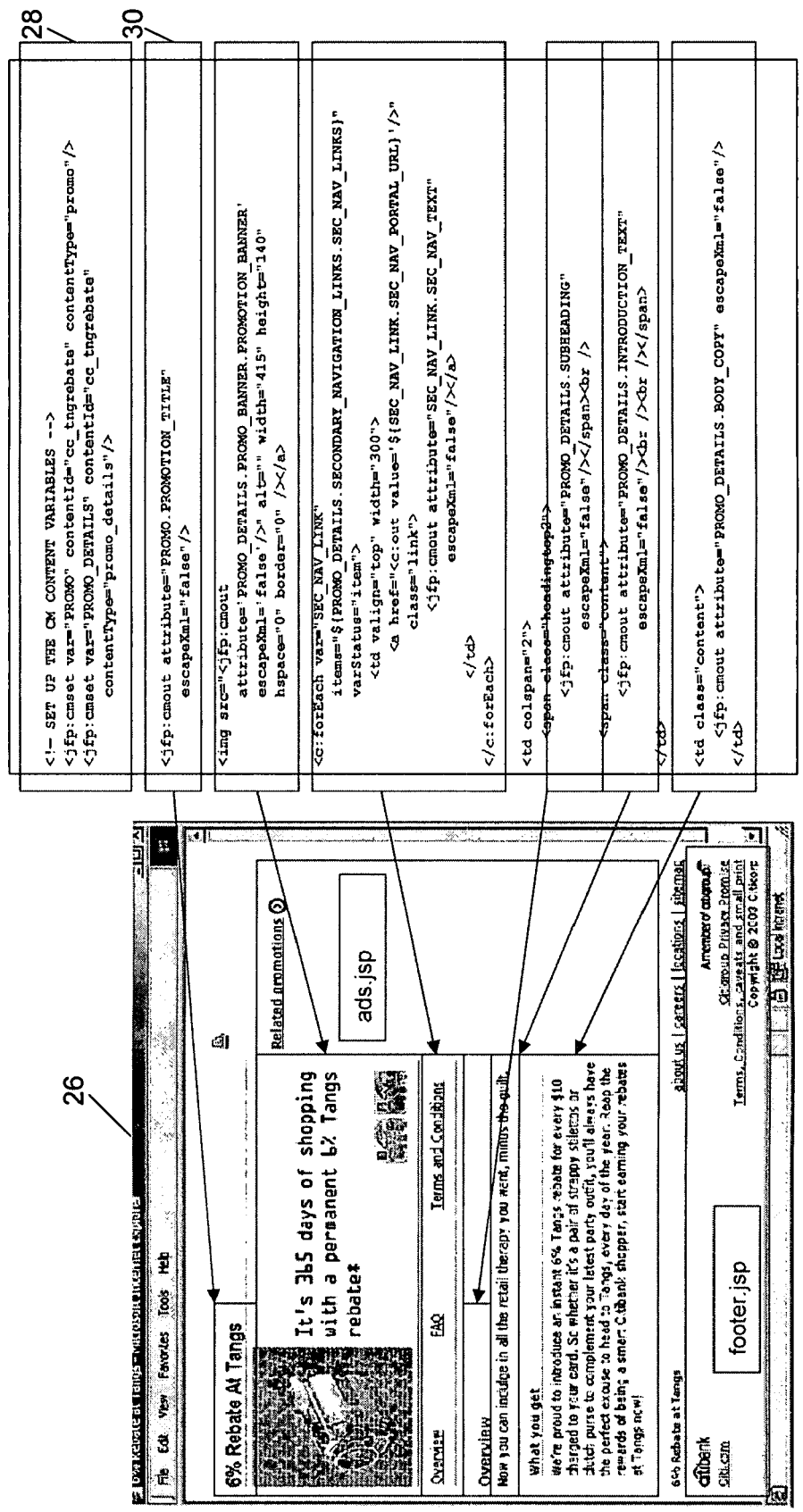
FIG. 5 shows examples of a GUI for embodiments of the invention for the business user's development of the presentation JAVA SERVER PAGE (JSP) page using JAVA financial platform (JFP) content management tags, that involves, for example, setting up page variables using cmset tags and building the layout using cmout tags.

FIG. 4 shows examples of a graphical user interface (GUI) 24 for the development of a DCT 16 at S1, as shown in FIG. 2, for promo details content type with necessary fields for data that the business user 10 wants to content manage and add supporting config files. FIG. 5 shows examples of a GUI 26 for the development of the presentation JSP page using JFP content management tags at S2, as shown in FIG. 2, that involves, for example, setting up page variables using cmset tags 28 and building the layout using cmout tags 30. At this point in the process for embodiments of the invention, development is complete, and the business user 10 can begin managing content.

Figure 6:
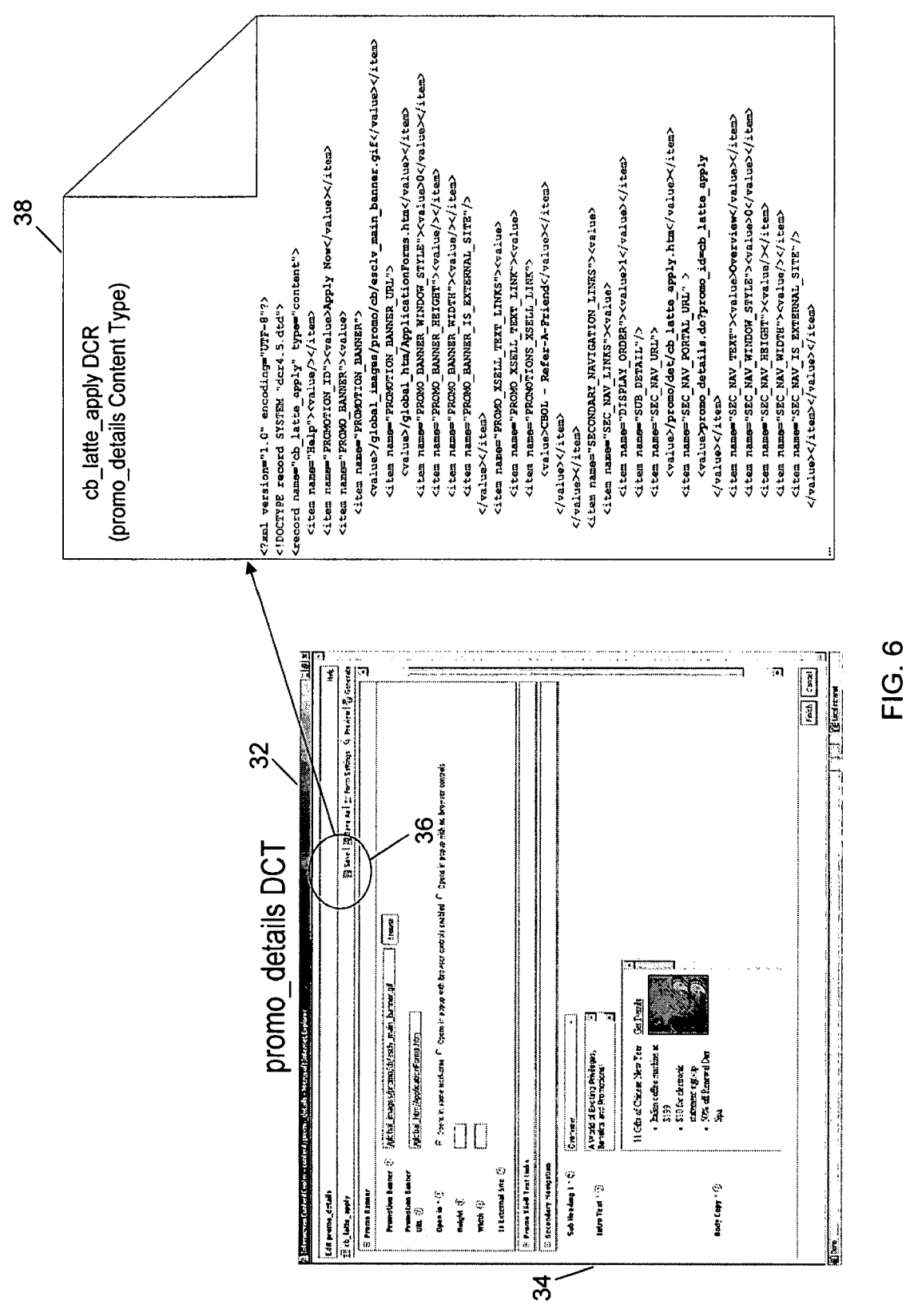
Figure 7:
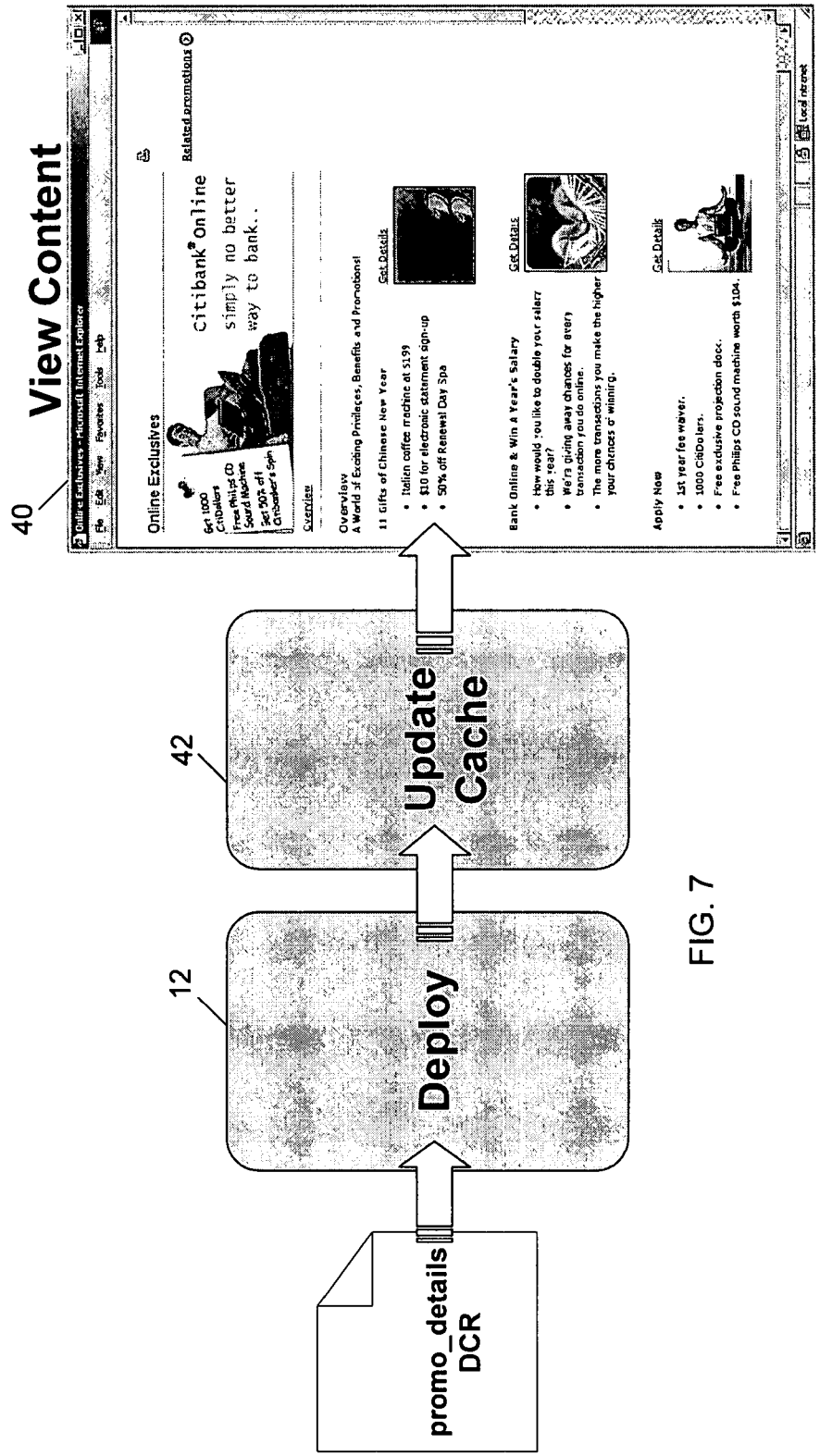
FIG. 7 shows an example of a GUI for embodiments of the invention that provides a preview of the page in connection with deploying, updating cache, and verifying content on the JFP development target server by the business user.

FIG. 6 shows examples of a GUI 32 for use by the business user 10 to create or edit contents in the DCT 16 at S3, as shown in FIG. 2, that involves, for example, filling in content fields 34 and clicking on "Save" 36 to automatically create a document content record (DCR) 38. FIG. 7 shows an example of a GUI 40 that provides a preview of the page in connection with deploying 12, updating cache, and verifying content on the JFP development target server by the business user 10 at S4, as shown in FIG. 2.

In the promotions use case, the business user 10 at a computer terminal brings up the content type, which in this example is the promotions content type. These are the types of things that are often seen, for example, on websites of providers of financial services, such as banking services. The business user 10 then fills in the content for a particular promotion and saves it in a content management system format. The JFP deployment for embodiments of the invention integrates a specialized tuple processor 44, as shown in FIG. 1, with technology, such as available from INTERWOVEN, to take the format of a particular content management system and change that format into a standard XML format that is understood by the JFP system.

Embodiments of the invention push this information from the content management system to a JFP server. Thus, embodiments of the invention provide a conversion of format into a normalized XML format for the information and push the information into the JFP server. At the time the information is pushed into the JFP server, it is saved into certain relational database tables. When the JFP system 46, as shown in FIG. 1, for embodiments of the invention is restarted, or when the caches are refreshed, the JFP system 46 loads up this information into memory and caches the content that was previously pushed into the JFP system. The information is thus made available, for example, for dynamic pages such as JSPs 48, as shown in FIG. 1, which is part of a JAVA-based application server, to enable use of a tag technology 50, such as JSP tag technology 52, to then display the content and even to run personalization rules 54 to show a different content to the user.

To summarize the foregoing process through the content management system for embodiments of the invention, the DCT 16 is built, and at presentation, a JSP page 56, as shown in FIG. 1, is created on the JSP side. The business user 10 as content author brings up the DCT 16 and edits the content inside it. Using the content management workflow, this content is deployed 12 or pushed into a repository of the JFP (i.e., into a database system) for embodiments of the invention, is cached 14, and is then displayed.

A significant aspect of embodiments of the invention is that the content created by business users is compiled as a JAVA code which enables the process to be dynamic. Providing dynamic behavior for embodiments of the invention makes the process extremely fast, for example, because the content need not be parsed or 'stringed' but is viewed immediately as a JAVA code that runs as a JAVA byte code, which is equivalent of what is done by other compiled applications so the processing is extremely fast. For the same reason, dynamic code can be embedded within the content for embodiments of the invention, which makes the content extremely dynamic and capable of being personalized.

The promotions use case described above is an example of creating simple content without any personalization rules attached to or associated with the content in which the user through a JSP page 56 makes a reference to a specific promotion which was copied from the content management system and then simply views the promotion on the screen without applying any type of personalization rule to it. However, there are cases, for example, within a banking environment in which there is a need to differentiate between different types of users. For example, in the banking environment, there may be a normal type of user whose net worth is less than $100,000, which can be referred to in this example as a 'Blue' user, and there may be other user's whose net worth is greater than $100,000, which can be referred to in this example as 'Gold' users. Currently, the only way in which the financial institution can differentiate between a Gold user and a Blue user is by the information in a user profile that is running and logged on into the system.

Thus, there is a present need for dynamic behavior according to embodiments of the invention as a way, for example, to predefine that someone is a Gold user or a Blue user. An aspect of JFP for embodiments of the invention is personalization rules, which is a JAVASCRIPT that gets compiled into code, so it is very efficient. As soon as one of these scripts is associated with a content, it becomes extremely powerful. For example, in the promotion use case, when a business user 10 needs to use personalization in the content management system for embodiments of the invention, the business user creates two contents: one for Gold users and one for Blue users. In addition, the business user 10 also creates a third piece of information, which is a rule. A rule can be thought of as a script which says essentially 'If a user profile is shown as a Gold user, please show the promotion Gold, otherwise show the promotion Blue.

Figure 8:
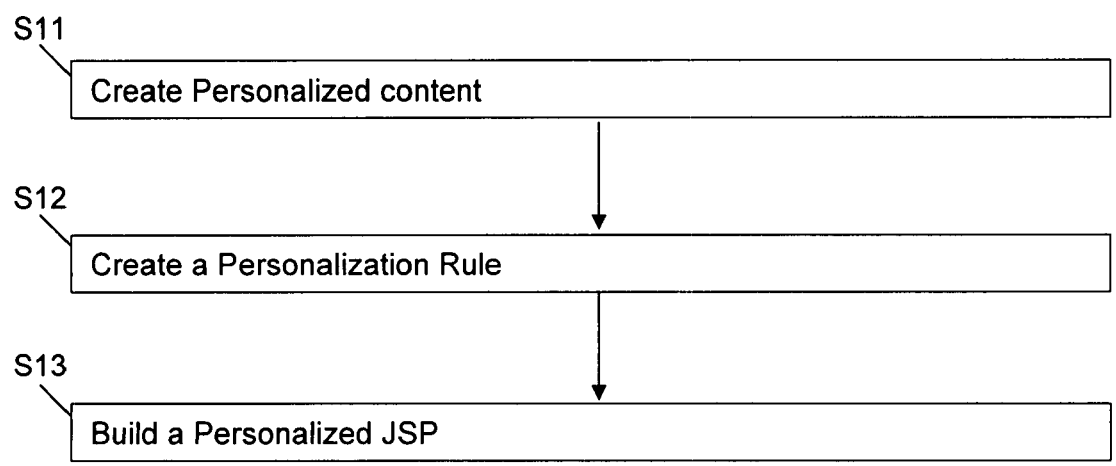
FIG. 8 is a flow chart which illustrates an example of the process of creating a page that contains personalized information with the content management framework for embodiments of the invention.
Figure 9:
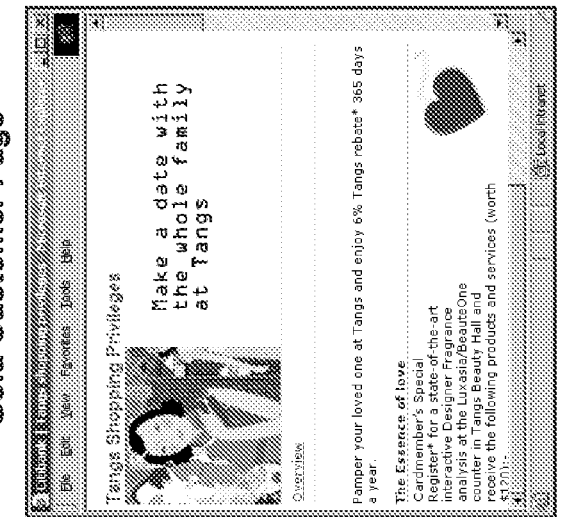
FIG. 9 shows an example of a display of two separate promo details pages for two different versions of customer pages having the same layout with different content for embodiments of the invention.
Figure 9:
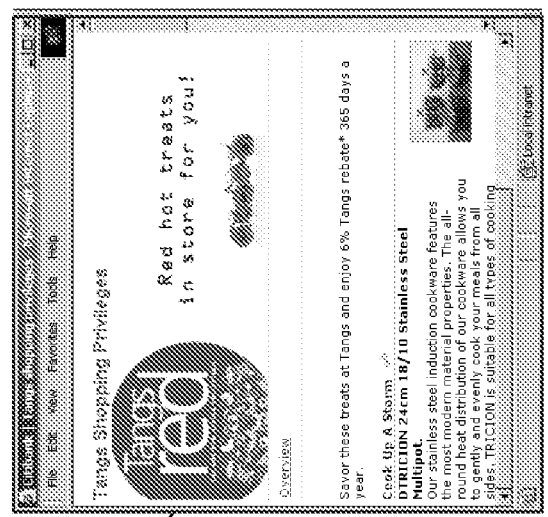

FIG. 8 is a flow chart which illustrates an example of the process of creating a page that contains personalized information with the content management framework for embodiments of the invention. Referring to FIG. 8, at S11, the business user 10 creates personalized content. At S12, the business user 10 creates a personalization rule. At S13, the business user 10 builds a personalized JSP. FIG. 9 shows an example of a display of two separate promo details pages for a Blue customer page 58 versus a Gold customer page 60 having the same layout with different content.

Figure 10:
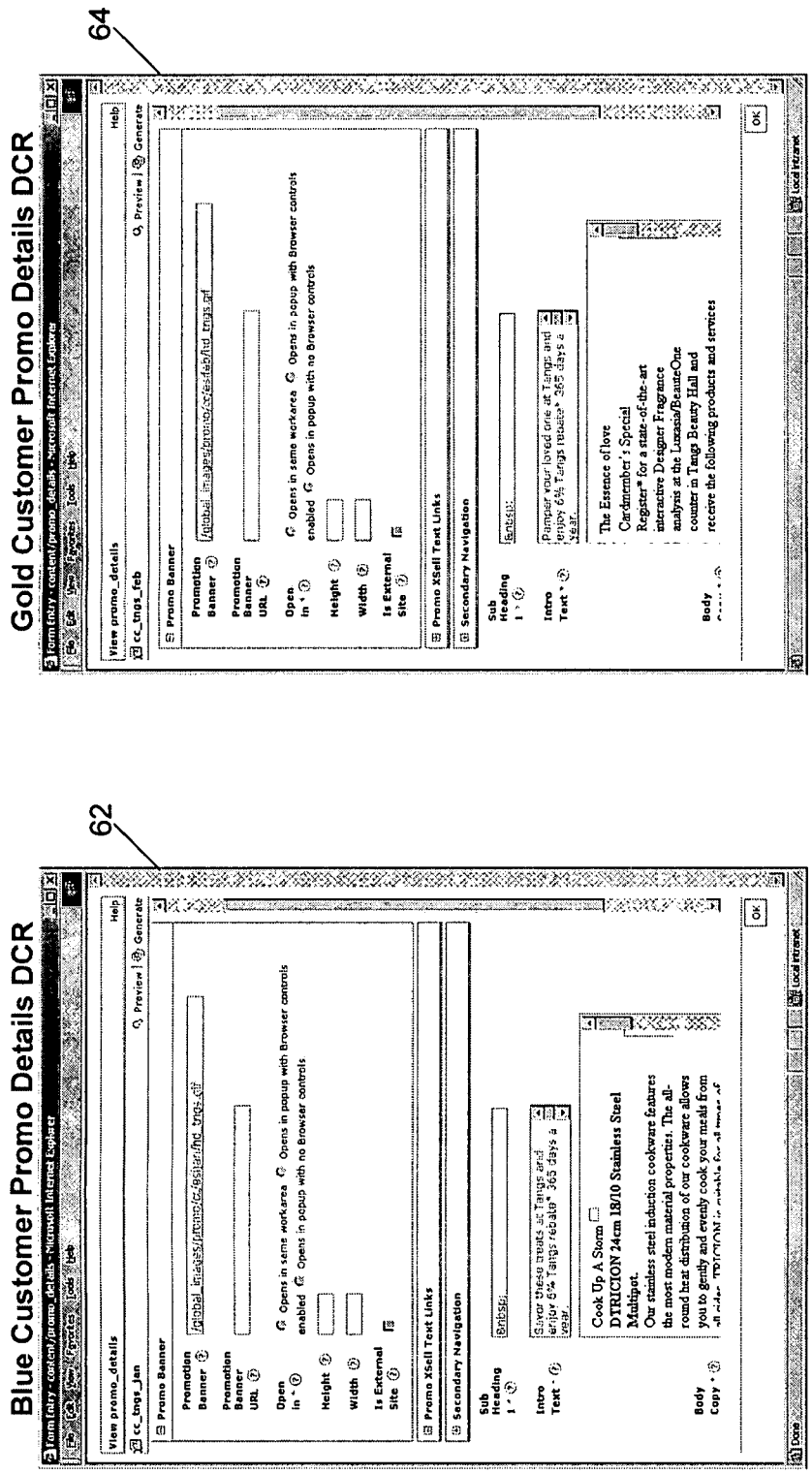
FIG. 10 shows examples of a GUI for embodiments of the invention for creating two different versions of customer promo details content after launching the promo details DCT by the business user in creating personalized content.
Figure 11:
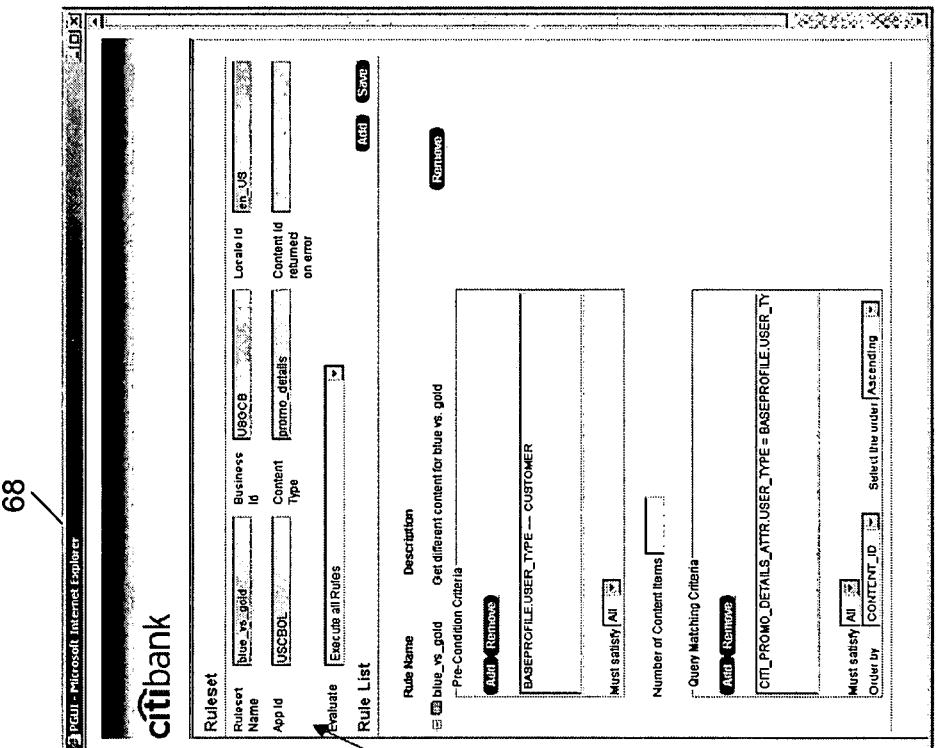
FIG. 11 shows examples of a GUI for embodiments of the invention for creating a personalization rule for type "promo_details", that involves launching the content management system personalization rule DCT, launching the personalization rule GUI from the DCT to build the rule, and saving and deploying the DCR.
Figure 11:
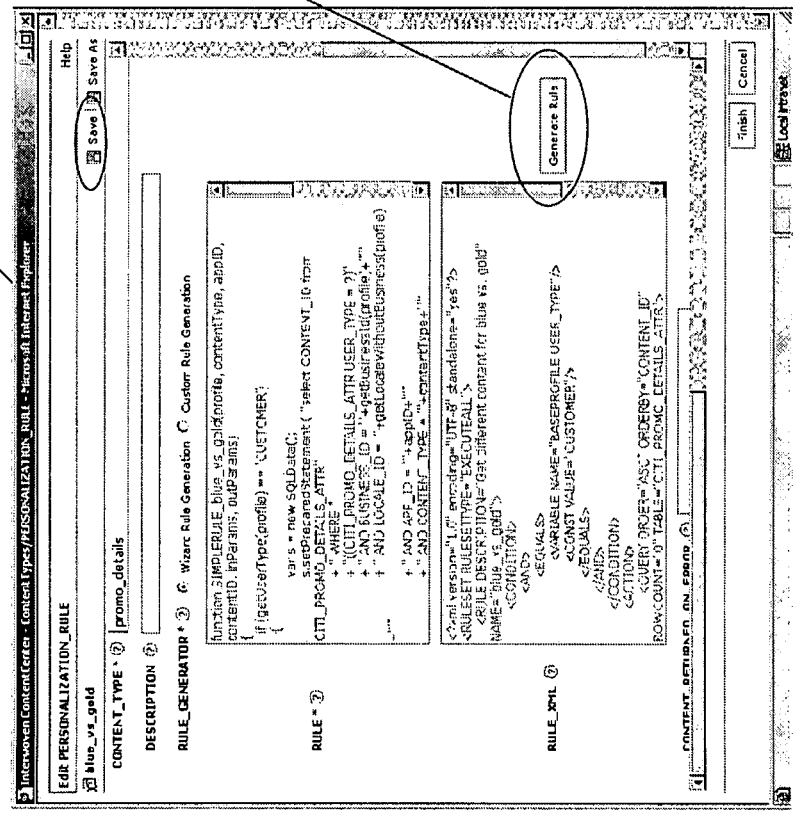
Figure 12:
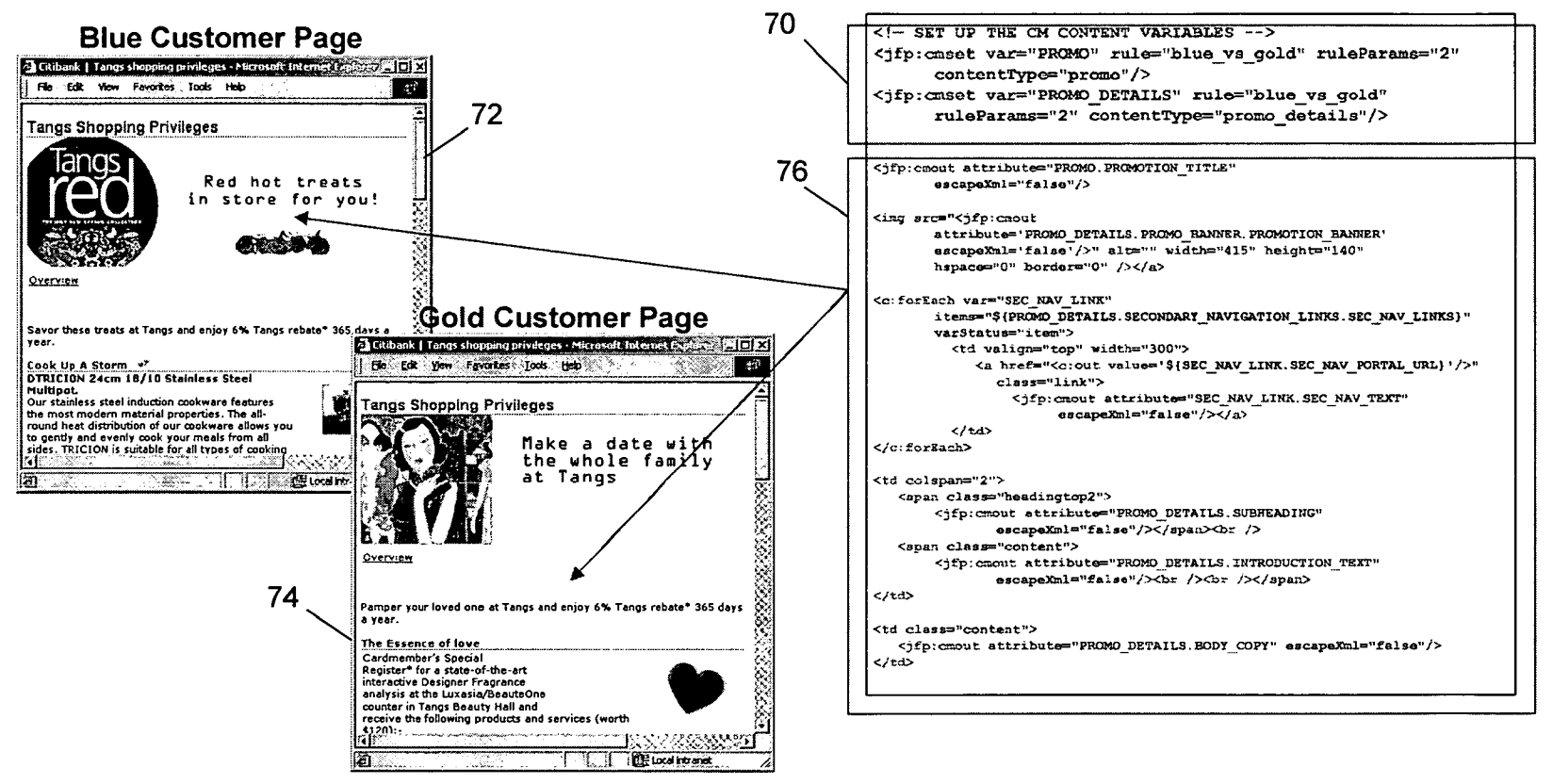

FIG. 10 shows examples of a GUI 62 for creating Blue customer promo details content and a GUI 64 for creating Gold customer promo details content after launching the promo details DCT by the business user 10 in creating personalized content at S11, as shown in FIG. 8. FIG. 11 shows examples of a GUI for creating a personalization rule for type "promo_details" at S12, as shown in FIG. 8, that involves launching the content management system personalization rule DCT 66, launching the personalization rule GUI 68 from the DCT 66 to build the rule, and saving and deploying the DCR. FIG. 12 shows examples of a GUI for building a personalized JSP at S13, as shown in FIG. 8, that involves setting up page variables using a rule with the cmset tag 70 such that the rule returns a Blue customer page 72 or a Gold customer page 74 and building the layout using cmout tags 76.

In the personalization example, the three pieces of information, i.e., the content for Gold users, the content for Blue users, and the rule, are first translated to XML format and into JFP XML format and are all deployed to the JFP database system. When the JFP application server starts running, they are cached and compiled into JAVA byte code.

Thereafter, when a specialized tag in a JSP page again needs to display a certain content, it calls in a content. However, because there is a rule associated with that content, that rule for that piece of code is executed behind the scene, and the rule returns either the promotion Gold or the promotion Blue.

An extremely powerful feature of the content management framework for embodiments of the invention is the utilization of embedded custom tags. In this aspect, a business user 10 creates a piece of content and the content management system for embodiments of the invention immediately embeds a customer tag inside that content. JSP custom tags which are used in servlets are somewhat similar to the look and feel of HTML tags, for example, with some type of a tag name plus certain attributes and values, which basically says this is a boundary of the tag. In embodiments of the invention, these JSP custom tags essentially replace the value in those locations within the content at run time again and are thus dynamic.

Assume, for example, that a business user 10 of the content management system for embodiments of the invention creates a piece of content and that a date needs to be embedded in the middle of the content. The JSP for embodiments of the invention has many of these custom tags for the content, such as 'date' tags which embed the tag with the date. When this content is deployed to the JSP application server, even before caching, the JFP for embodiments of the invention parses the data for the tag and the information in it and compiles all this information into JAVA class, and the content is then cached and ready for a user. Thereafter, at run time, when the tag that is thus embedded within the content is dynamically executed, a user viewing the displayed content sees, for example, the correct current date and/or time (i.e., the date and/or time of execution) displayed within the content.

Employment of these flexible features, such as the use of tags and compilation into JAVA source code and the combination of personalization rules associated with selecting content, in the content management platform for embodiments of the invention provides the content user or the business a great degree of control over what needs to be displayed at run time with the application server.

Another aspect of embodiments of the invention is a feature referred to as 'category' which essentially categorizes the content and allows business users to categorize content within the content management system to create this content and to push it to the application server without coding or without requiring a developer. Thus, the content management system for embodiments of the invention that enables a business user to manage website content with little or no need for an application developer thereby greatly shortens the development cycle for businesses which need to frequently deploy significant dynamic content.

Figure 13:
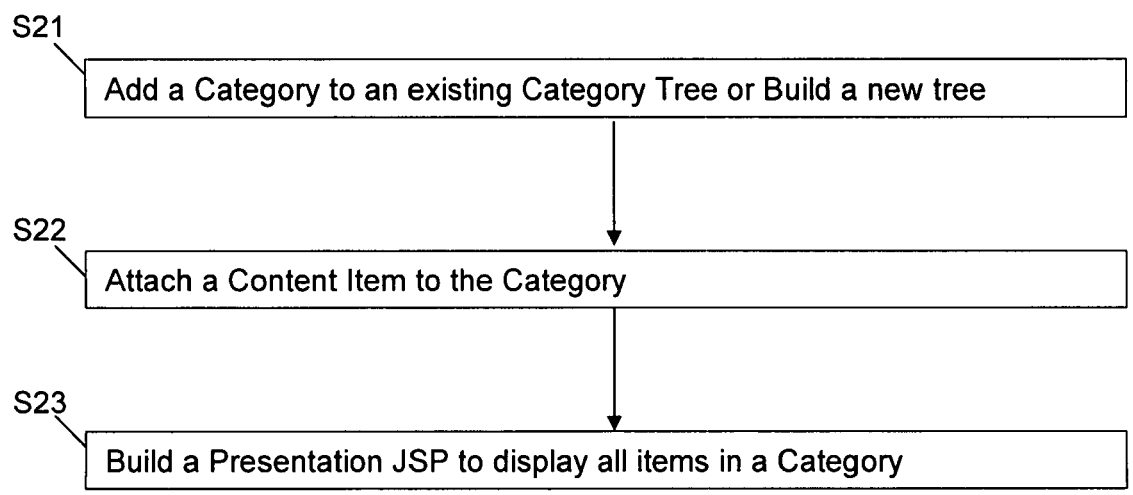
FIG. 13 is a flow chart which illustrates an example of the process of building a page using content category for embodiments of the invention.

The content categorization feature of the content management framework for embodiments of the invention allows content to be grouped into a hierarchical structure, which is very useful for applications such as 'Help Desk', 'FAQs', 'Promotions' and the like. FIG. 13 is a flow chart which illustrates an example of the process of building a page using content category for embodiments of the invention. Referring to FIG. 13, at S21, a business user 10 adds a category to an existing category tree or builds a new category. At S22, the business user 10 attaches a content item to the category. At S23, the business user 10 builds a presentation JSP page to display all items in a category.

Figure 14:
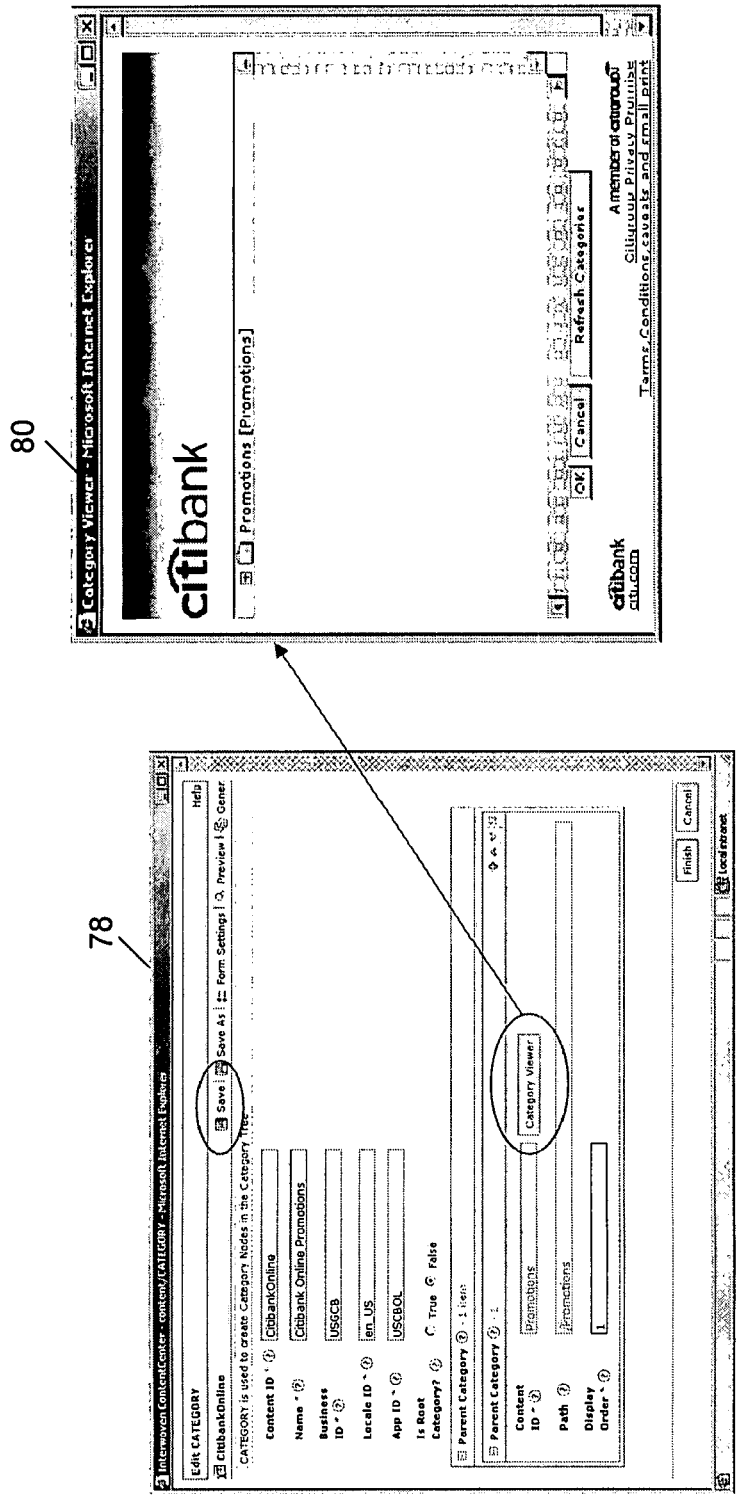
FIG. 14 shows examples of a GUI for embodiments of the invention for adding a category for displaying a list of promotions to a category tree which involves launching the content management system category DCT, launching a category viewer to add the new category to the tree under the promotions category, and saving and deploying.
Figure 15:
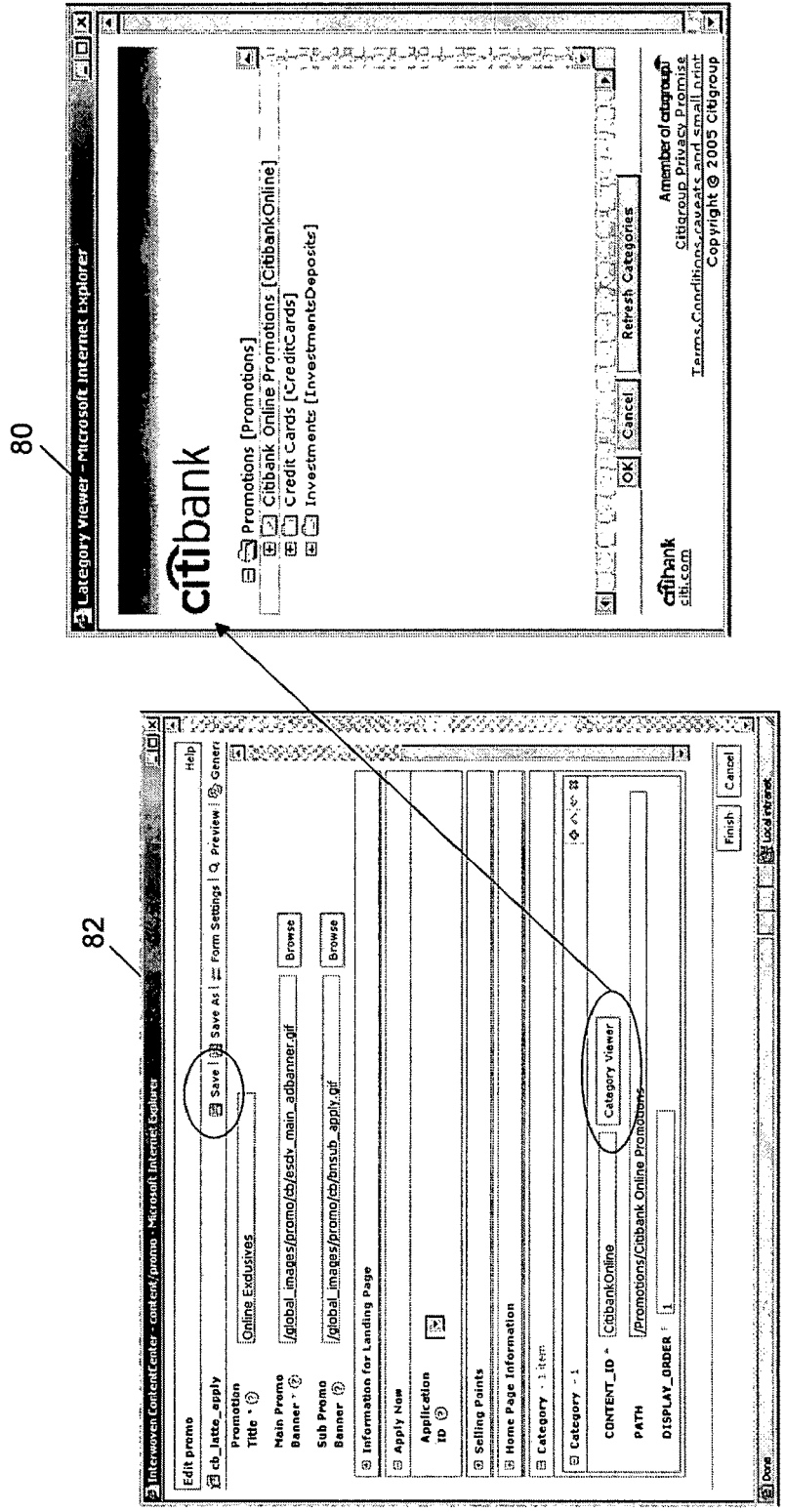
FIG. 15 shows examples of a GUI for embodiments of the invention for attaching the promo to the category which involves launching the promo DCT, launching the category viewer to add "cb_latte_apply" to the promotions category, and saving the DCR.
Figure 16:
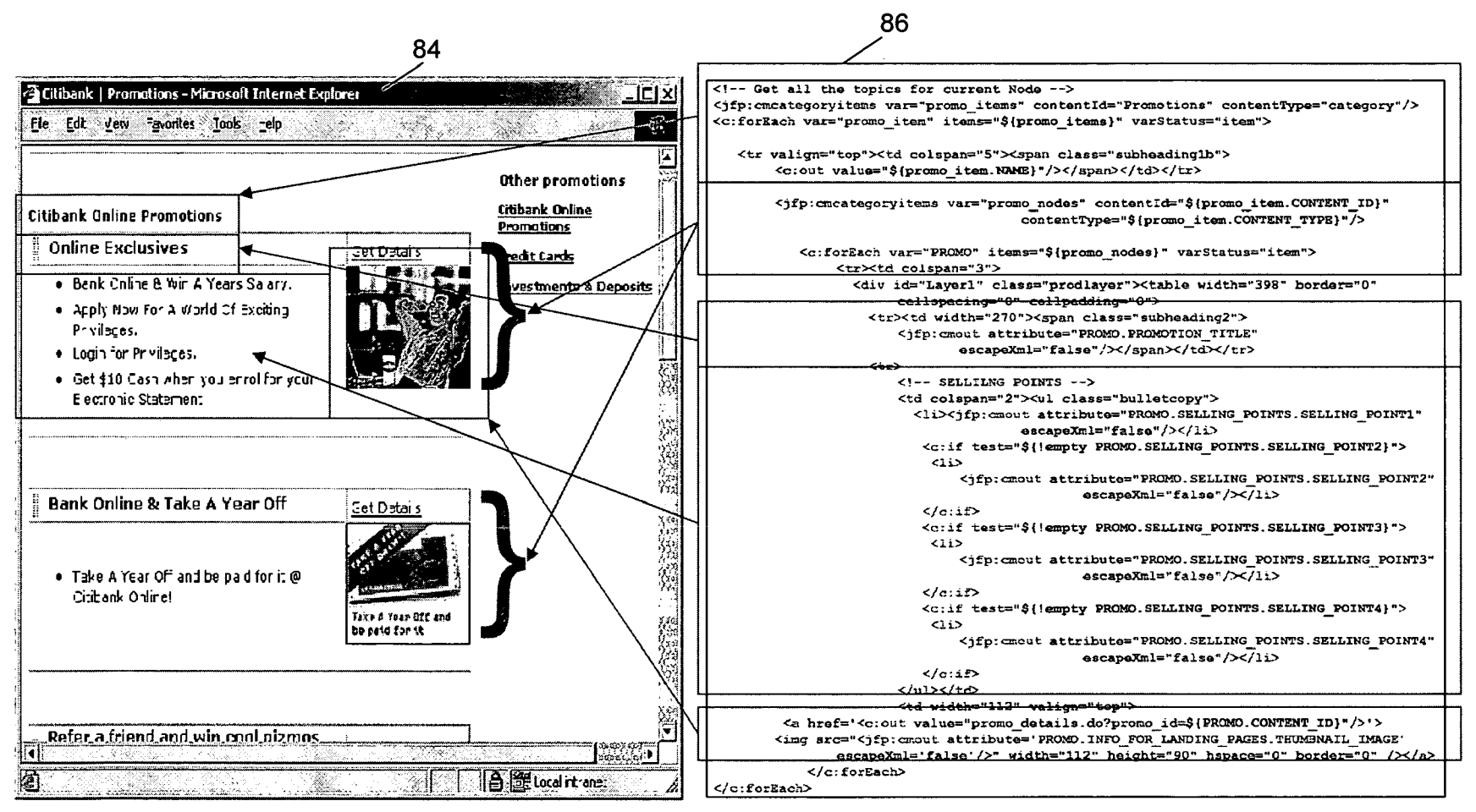

FIG. 14 shows examples of a GUI for adding a category for displaying a list of promotions to the category tree at S21, as shown in FIG. 13, which involves launching the content management system category DCT 78, launching the category viewer 80 to add a new category, such as "Online Banking" to the tree under the promotions category, and saving and deploying. FIG. 15 shows examples of a GUI for attaching the promo to the category at S22, as shown in FIG. 13, which involves launching the promo DCT 82, launching the category viewer 80 to add "cb_latte_apply" to the "Online Banking Promotions" category, and saving the DCR and deploying. FIG. 16 shows examples of a GUI for building a presentation JSP page to display all items from the category at S23, as shown in FIG. 13, which involves looping through each promo in the "Online Banking Promotions" Category 84 and displaying using the cmcategory tags 86.

The process of content categorization, i.e., setting up pages for content management for embodiments of the invention involves, for example, identifying content types by a business user by analyzing his or her site pages, such as 'Help Desk', 'FAQ', 'Promos', 'Products & Services', and the like; identifying shared content within and across the content types by the business user, such as 'Related Topics/Smart Ads' within 'Products & Services' content type; and identifying personalizable content, such as a 'Contact Us' link for Blue customers and Gold customers and navigation menus for visitors and customers, by the business user. Thereafter, the business user creates DCT templates for each content type and for his or her shared content, using a reference element to point to a shared content DCT to embed shared content in a DCT, and for personalized content, the business user creates DCRs for the various content, creates personalization rules, and uses appropriate JFP tags in JSPs.

Additional aspects of the content management system for embodiments of the invention include, for example, a specialized rule editor for creating the personalization rules that select which type of content to be shown and security features that enable integrating with commercially available security software, such as SITEMINDER, and enable virus scanning of the content being added to the content management system using commercially available security software, such as MCAFEE.

Further aspects of the content management system for embodiments of the invention, for example, are features that enable a business user to view dynamic content. A problem with viewing dynamic content is the existence of the tags because they are run-time features which grab information at run-time and are basically embedded in site content. Thus, it is very difficult to visualize this in the content management system because one does not know in advance, for example, whether someone is a Gold user or a Blue user and the rule does not know how to execute or from where to get the user profile. Therefore, one cannot see these dynamic features but can see only static feature. The content management framework for embodiments of the invention allows dynamic content to be authored through JFP tags by a Business user and the content deployed to the target Production system with the resulting content caches to be easily refreshed on the fly and the dynamic features to be viewed immediately on what can be characterized as a sort of 'mini-JFP' system that immediately brings up the caches from the database and displays them to the user so the user can immediately see exactly what happens in the system even with the personalization aspect Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A system, comprising:
   a microprocessor coupled to memory and programmed to:
   receive user-authored content via a graphical user interface at a computer terminal using a data capture template;
   save the user-authored content via the graphical user interface to create a document content record;
   launch a user-selected promotion data capture template and a category viewer via the graphical user interface at the computer terminal;
   add a user-selected category of a display of a list of promotions to an existing category tree;
   attach at least one user-selected content item to the at least one added category of the display of the list of promotions using the promotion data capture template and category viewer via the graphical user interface at the computer terminal; and
   build a presentation page with static data and dynamic content displaying all items in the at least one added category.

2. The system of claim 1, wherein the microprocessor is further programmed to provide the data capture template via the graphical user interface displaying fields for entry of content data for a user-selected content type.

3. The system of claim 2, wherein the microprocessor is further programmed to provide the data capture template via the graphical user interface displaying fields for adding supporting config files.

4. The system of claim 2, wherein the microprocessor is further programmed to provide the data capture template comprising an Extensible Markup Language template that directs how entered content data should be deployed to a web server through Extensible Markup Language constructs in the data capture template.

5. The system of claim 1, wherein the microprocessor is further programmed to provide user presentation pages comprising presentation Java server pages via the graphical user interface at the computer terminal.

6. The system of claim 5, wherein the microprocessor is further programmed to provide the user presentation pages comprising the presentation Java server pages via the graphical user interface for setting up page variables using cmset tags and for building a layout using cmout tags.

7. The system of claim 1, wherein the microprocessor is further programmed to receive the user-authored content comprising user-created and user-edited content at the computer terminal via the graphical user interface displaying content fields for entering and editing the user-authored content.

8. The system of claim 1, wherein the microprocessor is further programmed to embed a custom tag inside the user-authored content.

9. The system of claim 8, wherein the microprocessor is further programmed to embed the custom tag comprising a date tag inside the user-authored content.

10. The system of claim 1, wherein the microprocessor is further programmed to deploy the user-authored content to a development server.

11. The system of claim 10, wherein the microprocessor is further programmed to display the user-authored content dynamically in an application server.

12. The system of claim 11, wherein the microprocessor is further programmed to display the user-authored content on a website identically in appearance to the user-authored content but with dynamic behavior.

13. The system of claim 1, wherein the microprocessor is further programmed to deploy the user-authored content to one of a web server and an application server.

14. The system of claim 1, wherein the microprocessor is further programmed to deploy the user-authored content to a database server.

15. The system of claim 14, wherein the microprocessor is further programmed to display and cache the user-authored content directly from a database.

16. The system of claim 1, wherein the microprocessor is further programmed to provide a preview of the presentation page with static data and dynamic content displaying all items in the at least one added category.

17. The system of claim 1, wherein the microprocessor is further programmed to convert the user-authored content from a predetermined format to an Extensible Markup Language format and push the converted content into a server.

18. The system of claim 17, wherein the microprocessor is further programmed to save the converted content into relational database tables.

19. The system of claim 1, wherein the microprocessor is further programmed to receive user-authored personalized content for alternative pages having identical layouts and different content.

20. The system of claim 19, wherein the microprocessor is further programmed to embed dynamic code within the user-authored personalized content.

21. The system of claim 20, wherein the microprocessor is further programmed to receive the user-authored personalized content comprising a user-created personalization rule for displaying the alternative pages according to pre-determined parameters of a profile of a web site visitor.

22. A method, comprising:
   receiving, by a microprocessor coupled to memory, user-authored content via a graphical user interface at a computer terminal using a data capture template;
   saving, by the microprocessor, the user-authored content via the graphical user interface to create a document content record;
   launching, by the microprocessor, a user-selected promotion data capture template and a category viewer via the graphical user interface at the computer terminal;
   adding, by the microprocessor, a user-selected category of a display of a list of promotions to an existing category tree;
   attaching, by the microprocessor, at least one user-selected content item to the at least one added category of the display of the list of promotions using the promotion data capture template and category viewer via the graphical user interface at the computer terminal; and
   building, by the microprocessor, a presentation page with static data and dynamic content displaying all items in the at least one added category.

* * * * *